(12) United States Patent  (10) Patent No.: US 7,691,539 B2
Hamamoto et al.  (45) Date of Patent: Apr. 6, 2010

(54) NON-AQUEOUS SECONDARY BATTERY HAVING INCREASED DISCHARGE CAPACITY RETENTION

(75) Inventors: Toshikazu Hamamoto, Ube (JP); Koji Abe, Ube (JP); Tsutomu Takai, Ube (JP); Yasuo Matsumori, Ube (JP)

(73) Assignee: UBE Industries, Ltd., Yamaguchi (JP)

( * ) Notice: Subject to any disclaimer, the term of this patent is extended or adjusted under 35 U.S.C. 154(b) by 1597 days.

(21) Appl. No.: 10/383,790

(22) Filed: Mar. 6, 2003

(65) Prior Publication Data

US 2005/0042521 A1  Feb. 24, 2005

Related U.S. Application Data

(63) Continuation of application No. 09/563,618, filed on May 2, 2000, now abandoned.

(30) Foreign Application Priority Data

Sep. 3, 1998 (JP) .................. 10-248975
Mar. 31, 1999 (JP) .................. 11-091496
Mar. 31, 1999 (JP) .................. 11-091497

(51) Int. Cl.
*H01M 6/16* (2006.01)

(52) U.S. Cl. .................. 429/340; 429/330; 429/332

(58) Field of Classification Search .................. 429/330, 429/332, 340, 231.8
See application file for complete search history.

(56) References Cited

U.S. PATENT DOCUMENTS

| 4,833,048 | A  | * | 5/1989  | Dejonghe et al. | 429/104 |
| 4,888,255 | A  | * | 12/1989 | Yoshimitsu et al. | 429/101 |
| 6,221,534 | B1 | * | 4/2001  | Takeuchi et al. | 429/347 |
| 6,866,966 | B2 | * | 3/2005  | Hamamoto et al. | 429/340 |
| 2002/0122988 | A1 | * | 9/2002 | Hamamoto et al. | 429/340 |
| 2004/0091786 | A1 | * | 5/2004 | Unoki et al. | 429/327 |
| 2004/0265702 | A1 | * | 12/2004 | Kim | 429/340 |
| 2005/0042521 | A1 | * | 2/2005 | Hamamoto et al. | 429/332 |

FOREIGN PATENT DOCUMENTS

JP   07-320779   * 12/1995
JP   10-247517     9/1998

* cited by examiner

*Primary Examiner*—Tracy Dove
(74) *Attorney, Agent, or Firm*—Buckley, Maschoff & Talwalkar LLC

(57) ABSTRACT

A method of increasing the discharge capacity retention of a non-aqueous lithium ion secondary battery having a positive electrode active material, a combination of a lithium element and a complex metal oxide, a negative electrode, and a non-aqueous electrolytic solution comprising an electrolyte dissolved in a non-aqueous solvent which is a combination of a cyclic carbonate and a linear carbonate by incorporating a disulfide derivative having the formula:

$$R^1-S-S-R^2$$

wherein each of $R^1$ and $R^2$ independently represents a phenyl group, a benzyl group, a tolyl group, a pyridyl group, a pyrimidyl group, an alkyl group having 1 to 12 carbon atom, or a cycloalkyl group having 3 to 6 carbon atoms, in which each group has no substituent groups or has one or more alkyl groups into the non-aqueous electrolytic solution.

9 Claims, No Drawings

NON-AQUEOUS SECONDARY BATTERY HAVING INCREASED DISCHARGE CAPACITY RETENTION

This application is a continuation application of U.S. patent application Ser. No. 09/563,618 filed May 2, 2000 now abandoned which claims the benefit of priority of Japanese application nos. 10-248975 of Sept. 3,1998; 11-091496 of Mar. 31, 1999 and 11-091497 of Mar. 31, 1999 (all expired), the complete disclosures of which are incorporated herein by reference.

FIELD OF THE INVENTION

The present invention relates to a non-aqueous secondary battery having increased discharge capacity retention, and a non-aqueous electrolytic solution advantageously employed for the non-aqueous secondary battery.

BACKGROUND OF THE INVENTION

At present, a non-aqueous secondary battery such as a lithium ion secondary battery is generally employed as an electric source for driving a small electronic device. The non-aqueous secondary battery comprises a positive electrode, a non-aqueous electrolytic solution, and a negative electrode. The non-aqueous lithium ion secondary battery preferably comprises a positive electrode of lithium complex oxide such as $LiCoO_2$, $LiMn_2O_4$, or $LiNiO_2$, a non-aqueous electrolytic solution such as a solution of electrolyte in a carbonate solvent such as ethylene carbonate (EC) or propylene carbonate (PC), and a negative electrode of carbonaceous material or lithium metal.

The non-aqueous secondary battery preferably has good battery characteristics such as large electric discharge capacity and high electric discharge retention. For instance, in a non-aqueous lithium ion secondary battery using a positive electrode of $LiCoO_2$, $LiMn_2O_4$, or $LiNiO_2$, oxidative decomposition of a portion of the non-aqueous electrolytic solution undergoes in the electric charging stage. The decomposition product disturbs electrochemical reaction so that the electric discharge capacity decreases. It is considered that the oxidative decomposition is caused in the non-aqueous solvent of the non-aqueous electrolytic solution on the interface between the positive electrode and the electrolytic solution.

Moreover, in a non-aqueous lithium ion secondary battery using negative electrode of carbonaceous material of high crystallinity such as natural graphite or artificial (or synthetic) graphite, reductive decomposition of the solvent of the non-aqueous electrolytic solution undergoes on the surface of the negative electrode in the charging stage. The reductive decomposition on the negative electrode undergoes after repeated charging-discharging procedures even in the case of using ethylene carbonate (EC) which is a preferably employed solvent of the electrolytic solution.

Japanese Patent Provisional Publication No. 10-247517 describes incorporation of a phenolic oxidation inhibitor, a phosphite oxidation inhibitor, or a sulfide oxidation inhibitor into a non-aqueous electrolytic solution of a secondary battery to keep the battery from abnormal exothermic reaction caused in the case of overcharging or formation of short circuit.

SUMMARY OF THE INVENTION

It is an object of the present invention to provide a method of increasing a discharge capacity retention of a non-aqueous secondary battery, particularly, a non-aqueous lithium ion secondary battery.

It is another object of the invention to provide a non-aqueous secondary battery having improved discharge capacity retention.

It is a further object of the invention to provide a non-aqueous electrolytic solution which is advantageously employable for preparing a non-aqueous secondary battery having improved discharge capacity retention.

The present invention resides in a method of increasing a discharge capacity retention of a non-aqueous secondary battery which comprising incorporation of a disulfide derivative having the following formula (I):

wherein each of $R^1$ and $R^2$ independently represents a phenyl group, a benzyl group, a tolyl group, a pyridyl group, a pyrimidyl group, an alkyl group having 1 to 12 carbon atom, or a cycloalkyl group having 3 to 6 carbon atoms, provided that each group may have one or more substituent groups into a non-aqueous electrolytic solution in such an amount that the discharge capacity retention after 50 discharge cycles is maintained at least 85%, preferably at least 90%, of the discharge capacity measured at a first discharge procedure and is higher than a discharge capacity retention after 50 discharge cycles measured on an equivalent non-aqueous electrolytic solution not containing the disulfide derivative by at least 4%.

The invention further provides a non-aqueous secondary battery which contains a disulfide derivative of the above-identified formula (I) in a non-aqueous electrolytic solution in such an amount that the discharge capacity retention after 50 discharge cycles is maintained at least 85%, preferably at least 90%, of the discharge capacity measured at a first discharge procedure and is higher than a discharge capacity retention after 50 discharge cycles measured on an equivalent non-aqueous electrolytic solution not containing the disulfide derivative by at least 4%.

The invention furthermore provides a non-aqueous electrolytic solution containing a disulfide derivative of the aforementioned formula (I) in a non-aqueous electrolytic solution in an amount of 0.02 to 0.9 weight %, preferably 0.05 to 0.5 weight %.

DETAILED DESCRIPTION OF THE INVENTION

The present invention is described below in more detail.

The present invention is characteristic by incorporation of a disulfide derivative of the below-mentioned formula (I) in a non-aqueous electrolytic solution containing electrolyte so that the electric discharge capacity retention can be increased. Various known materials are employed for constituting the non-aqueous secondary battery of the invention.

Disulfide Derivative

In the formula (I), each of $R^1$ and $R^2$ independently represents a phenyl group, a benzyl group, a tolyl group, a pyridyl group, a pyrimidyl group, an alkyl group having 1 to 12 carbon atom (preferably an alkyl group having 3 to 8 carbon atoms), or a cycloalkyl group having 3 to 6 carbon atoms (preferably a cycloalkyl group having 5 or 6 carbon atoms). These groups may have one or more substituent groups such as an alkyl group. Preferably, each of $R^1$ and $R^2$ is an aromatic group such as phenyl, benzyl, tolyl, pyridyl, or pyrimidyl.

Representative examples of the disulfide derivatives of the formula (I) include diphenyl disulfide, dibenzyl disulfide, di-p-tolyl disulfide, 2,2'-dipyridyl disulfide., 5,5'-dipyridyl disulfide, 2,2'-dipyrimidyl disulfide, di-n-butyl disulfide, di-iso-butyl disulfide, ditert-butyl disulfide, and dicyclohexyl disulfide.

The disulfide derivative of the formula (I) is incorporated into a non-aqueous electrolytic solution in such an amount that the discharge capacity retention after 50 discharge cycles is maintained at least 85%, preferably at least 90%, of the discharge capacity measured at a first discharge procedure and is higher than a discharge capacity retention after 50 discharge cycles measured on an equivalent non-aqueous electrolytic solution not containing the disulfide derivative by at least 4%, preferably at least 6%.

The amount of the disulfide derivative of the formula (I) may be in the range of 0.001 to 2 weight % based on the amount of the non-aqueous electrolytic solution. However, it is generally preferred to incorporate the disulfide derivative in an amount of 0.02 to 0.9 weight %, more preferably 0.05 to 0.5 weight %, based on the amount of the non-aqueous electrolytic solution, so that the discharge capacity retention is prominently increased.

There are no specific limitations with respect to the non-aqueous solvent for the preparation of the electrolytic solution. The non-aqueous solvent is generally selected from known non-aqueous solvents for the preparation of non-aqueous electrolytic solutions. A preferred non-aqueous solvent is a mixture of a solvent of a high dielectric constant and a solvent having a low viscosity.

Preferred examples of the solvents of a high dielectric constant include cyclic carbonate solvents such as ethylene carbonate (EC), propylene carbonate (PC), and butylene carbonate (BC). The solvents of a high dielectric constant are employed singly or in combination.

Examples of the solvents of a low viscosity include linear carbonates such as dimethyl carbonate (DMC), methyl ethyl carbonate (MEC), and diethyl carbonate (DEC), ethers such as tetrahydrofuran, 2-methyltetrahydrofuran, 1,4-dioxane, 1,2-dimethoxyethane, 1,2-diethoxyethane, and 1,2-dibutoxyethane, lactones such as γ-butyrolactone, nitriles such as acetonitrile, esters such as methyl propionate, and amides such as dimethylformamide. The solvents of a low viscosity are employed singly or in combination.

The solvent of a high dielectric constant and the solvent of a low viscosity can be mixed in an optionally chosen ratio, but are generally mixed in a volume ratio of 1:9 to 4:1 (high dielectric constant solvent:low viscosity solvent), preferably 1:4 to 7:3.

Examples of the electrolytes to be incorporated into the non-aqueous solvent include $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(CF_3)_3$, $LiPF_3(C_2F_5)_3$, $LiPF_5(iso-C_3F_7)$, and $LiPF_4(iso-C_3F_7)_2$. The electrolytes can be employed singly or in combination. Generally, the electrolyte can be incorporated into the non-aqueous solvent in such an amount to give an electrolytic solution of 0.1 M to 3 M, preferably 0.5M to 1.5M.

The non-aqueous electrolytic solution of the invention is generally prepared by dissolving the electrolyte and the disulfide derivative of the formula (I) in a mixture of a high dielectric constant solvent and a low viscosity solvent.

The non-aqueous secondary battery of the invention comprises a positive electrode and a negative electrode in addition to the non-aqueous electrolytic solution containing the disulfide derivative of the formula (I).

The positive electrode generally comprises a positive electrode active material and an electro-conductive binder composition.

The positive electrode active material preferably is a complex metal oxide containing one metal element selected from the group consisting of cobalt, manganese, nickel, chromium, iron, and vanadium and a lithium element. Examples of the complex metal oxides include $LiCoO_2$, $LiMn_2O_4$, and $LiNiO_2$.

The electro-conductive binder composition can be produced by a mixture of an electro-conductive material such as acetylene black or carbon black, a binder such as polytetrafluoroethylene (PTFE) or poly(vinylidene fluoride) (PVDF), and a solvent. For the preparation of a positive electrode, the mixture is coated on a metal plate such as aluminum foil or stainless plate, dried, and pressed for molding. The molded product is then heated in vacuo at a temperature of approx. 50 to 250° C. for approx. 2 hours, to give the desired positive electrode.

The negative electrode comprises a negative electrode active material such as a lithium metal, a lithium alloy, carbonaceous material having a graphite-type crystalline structure which can absorb and release lithium ion, or a complex tin oxide. Examples of the carbonaceous materials include thermally decomposed carbonaceous materials, cokes, graphites (e.g., artificial graphite and natural graphite), fired organic polymer materials, and carbon fibers. Preferred are carbonaceous materials having a graphite-type crystalline structure in which the lattice distance of lattice surface (002), namely, $d_{002}$, is in the range of 3.35 to 3.40 angstrom. The negative electrode active material in the powdery form such as carbonaceous powder is preferably used in combination with a binder such as ethylene propylene diene terpolymer (EPDM), polytetrafluoroethylene (PTFE) or poly(vinylidene fluoride) (PVDF).

There are no specific limitations with respect to the structure of the non-aqueous secondary battery of the invention. For instance, the non-aqueous secondary battery can be a battery of coin type comprising a positive electrode, a negative electrode, and single or plural separators, or a cylindrical or prismatic battery comprising a positive electrode, a negative electrode, and a separator roll. The separator can be a known microporous polyolefin film, woven fabric, or non-woven fabric.

The present invention is further described by the following non-limiting examples.

EXAMPLE 1

1) Preparation of Non-Aqueous Electrolytic Solution

In a non-aqueous mixture of ethylene carbonate and dimethyl carbonate [EC:DMC=1:2, volume ratio] was dissolved $LiPF_6$ to give a non-aqueous electrolytic solution of 1 M concentration. To the electrolytic solution was added diphenyl disulfide in an amount of 0.05 wt. % (based on the amount of the electrolytic solution).

2) Preparation of Lithium Secondary Battery and Measurement of its Battery Characteristics $LiCoO_2$ (positive electrode active material, 80 wt. %), acetylene black (electro-conductive material, 10 wt. %), and poly(vinylidene fluoride) (binder, 10 wt. %) were mixed. To the resulting mixture was further added 1-methyl-2-pyrrolidone (solvent). Thus produced positive electrode mixture was coated on aluminum foil, dried, molded under pressure, and heated to give a positive electrode.

Natural graphite (negative electrode active material, 90 wt. %) and poly(vinylidene fluoride) (binder, 10 wt. %) were mixed. To the resulting mixture was further added 1-methyl-2-pyrrolidone (solvent). Thus produced negative electrode mixture was coated on copper foil, dried, molded under pressure, and heated to give a negative electrode.

The positive and negative electrodes, a microporous polypropylene film separator, and the non-aqueous electrolytic solution were combined to give a coin-type battery (diameter: 20 mm, thickness: 3.2 mm).

The coin-type battery was charged at room temperature (20° C.) with a constant electric current (0.8 mA) to reach 4.2 V and then the charging was continued under a constant voltage of 4.2 V. In total, the charging was performed for 5 hours. Subsequently, the battery was discharged to give a constant electric current (0.8 mA). The discharge was continued to give a terminal voltage of 2.7 V. The charge-discharge cycle was repeated 50 times.

The initial discharge capacity was essentially equal to that measured in a battery using an EC/DMC (½) solvent mixture (containing no diphenyl disulfide) [see Comparison Example 1].

After the 50 cycle charge-discharge procedure, the discharge capacity was 92.7% of the initial discharge capacity. The low temperature characteristics were satisfactory.

The preparation and evaluation of the battery are summarized in Table 1.

EXAMPLE 2

The procedures for the preparation of non-aqueous electrolytic solution of Example 1 were repeated except for using diphenyl disulfide in an amount of 0.2 wt. %. Thus prepared non-aqueous electrolytic solution was employed for the manufacture of battery of coin-type in the same manner as in Example 1.

After the 50 cycle charge-discharge procedure, the discharge capacity was 90.5% of the initial discharge capacity.

The preparation and evaluation of the battery are summarized in Table 1.

EXAMPLE 3

The procedures for the preparation of non-aqueous electrolytic solution of Example 1 were repeated except for using diphenyl disulfide in an amount of 0.02 wt. %. Thus prepared non-aqueous electrolytic solution was employed for the manufacture of battery of coin-type in the same manner as in Example 1.

After the 50 cycle charge-discharge procedure, the discharge capacity was 91.2% of the initial discharge capacity.

The preparation and evaluation of the battery are summarized in Table 1.

EXAMPLE 4

The procedures for the preparation of non-aqueous electrolytic solution of Example 1 were repeated except for using di-p-tolyl disulfide in an amount of 0.1 wt. %. Thus prepared non-aqueous electrolytic solution was employed for the manufacture of battery of coin-type in the same manner as in Example 1.

After the 50 cycle charge-discharge procedure, the discharge capacity was 92.4% of the initial discharge capacity.

The preparation and evaluation of the battery are summarized in Table 1.

EXAMPLE 5

The procedures for the preparation of non-aqueous electrolytic solution of Example 1 were repeated except for using di-n-butyl disulfide in an amount of 0.1 wt. %. Thus prepared non-aqueous electrolytic solution was employed for the manufacture of battery of coin-type in the same manner as in Example 1.

After the 50 cycle charge-discharge procedure, the discharge capacity was 92.1% of the initial discharge capacity.

The preparation and evaluation of the battery are summarized in Table 1.

EXAMPLE 6

The procedures for the preparation of non-aqueous electrolytic solution of Example 1 were repeated except for using 2,2'-dipyridyl disulfide in an amount of 0.1 wt. %. Thus prepared non-aqueous electrolytic solution was employed for the manufacture of battery of coin-type in the same manner as in Example 1.

After the 50 cycle charge-discharge procedure, the discharge capacity was 89.3% of the initial discharge capacity.

The preparation and evaluation of the battery are summarized in Table 1.

EXAMPLE 7

The procedures for the preparation of non-aqueous electrolytic solution of Example 1 were repeated except for replacing the non-aqueous solvent mixture of ethylene carbonate and dimethyl carbonate with a non-aqueous solvent mixture of ethylene carbonate, propylene carbonate and dimethyl carbonate [EC:PC:DMC=1:1:2, volume ratio]. Thus prepared non-aqueous electrolytic solution was employed for the manufacture of battery of coin-type in the same manner as in Example 1.

The initial discharge capacity was essentially equal to that measured in a battery using an EC/DMC (½) solvent mixture (containing no diphenyl disulfide) [see Comparison Example 1].

After the 50 cycle charge-discharge procedure, the discharge capacity was 92.3% of the initial discharge capacity.

The preparation and evaluation of the battery are summarized in Table 1.

EXAMPLE 8

The procedure for the preparation of negative electrode was repeated except for replacing the natural graphite with artificial graphite. Thus prepared negative electrode was employed for the manufacture of battery of coin-type in the same manner as in Example 1.

After the 50 cycle charge-discharge procedure, the discharge capacity was 88.5% of the initial discharge capacity.

The preparation and evaluation of the battery are summarized in Table 1.

EXAMPLE 9

The procedure for the preparation of positive electrode was repeated except for replacing the LiCoO$_2$ with LiMn$_2$O$_4$. Thus prepared positive electrode was employed for the manufacture of battery of coin-type in the same manner as in Example 1.

After the 50 cycle charge-discharge procedure, the discharge capacity was 93.8% of the initial discharge capacity.

The preparation and evaluation of the battery are summarized in Table 1.

Comparison Example 1

The procedures for the preparation of non-aqueous electrolytic solution of Example 1 were repeated except for using no diphenyl disulfide. Thus prepared non-aqueous electrolytic solution was employed for the manufacture of battery of coin-type in the same manner as in Example 1.

After the 50 cycle charge-discharge procedure, the discharge capacity was 83.8% of the initial discharge capacity.

The preparation and evaluation of the battery are summarized in Table 1.

TABLE 1

| Example | Electrode positive/negative | Disulfide derivative (wt. %) | Electrolytic solution (vol. ratio) | discharge capacity retention |
|---|---|---|---|---|
| Ex. 1 | LiCoO$_2$/nat. graphite | diphenyl disulfide (0.05) | 1 M LiPF$_6$ EC/DMC = 1/2 | 92.7% |
| Ex. 2 | LiCoO$_2$/nat. graphite | diphenyl disulfide (0.2) | 1 M LiPF$_6$ EC/DMC = 1/2 | 90.5% |
| Ex. 3 | LiCoO$_2$/nat. graphite | diphenyl disulfide (0.02) | 1 M LiPF$_6$ EC/DMC = 1/2 | 91.2% |
| Ex. 4 | LiCoO$_2$/nat. graphite | di-p-tolyl disulfide (0.1) | 1 M LiPF$_6$ EC/DMC = 1/2 | 92.4% |
| Ex. 5 | LiCoO$_2$/nat. graphite | di-n-butyl disulfide (0.1) | 1 M LiPF$_6$ EC/DMC = 1/2 | 92.1% |
| Ex. 6 | LiCoO$_2$/nat. graphite | 2,2'-dipyridyl disulfide (0.1) | 1 M LiPF$_6$ EC/DMC = 1/2 | 89.3% |
| Ex. 7 | LiCoO$_2$/nat. graphite | diphenyl disulfide (0.05) | 1 M LiPF$_6$ EC/PC/DMC = 1/1/2 | 92.3% |
| Ex. 8 | LiCoO$_2$/art. graphite | diphenyl disulfide (0.05) | 1 M LiPF$_6$ EC/DMC = 1/2 | 88.5% |
| Ex. 9 | LiMn$_2$O$_4$/nat. graphite | diphenyl disulfide (0.05) | 1 M LiPF$_6$ EC/DMC = 1/2 | 93.8% |
| Com. 1 | LiCoO$_2$/nat. graphite | none | 1 M LiPF$_6$ EC/DMC = 1/2 | 83.8% |

What is claimed is:

1. A non-aqueous secondary battery having a positive electrode comprising, as the positive electrode active material, a combination of a lithium element and a complex metal oxide, a negative electrode comprising carbonaceous material having a graphite crystalline structure, and a non-aqueous electrolytic solution comprising an electrolyte dissolved in a non-aqueous solvent comprising a combination of a cyclic carbonate and a linear carbonate wherein the ratio of cyclic carbonate to linear carbonate ranges from 1:4 to 7:3 and which contains a disulfide derivative having the following formula:

$$R^1\text{—}S\text{—}S\text{—}R^2$$

wherein each of $R^1$ and $R^2$ independently represents a phenyl group, a benzyl group, a tolyl group, a pyridyl group, a pyrimidyl group, an alkyl group having 1 to 12 carbon atom, or a cycloalkyl group having 3 to 6 carbon atoms, provided that each group may have one or more substituent groups in an amount of 0.02 to 0.9 weight % based on the amount of the electrolytic solution, whereby the discharge capacity retention after 50 discharge cycles is maintained at least 85% of the discharge capacity measured at a first discharge procedure and is higher than a discharge capacity retention after 50 discharge cycles measured on an equivalent non-aqueous electrolytic solution not containing the disulfide derivative by at least 4%.

2. The non-aqueous secondary battery of claim 1, wherein the disulfide derivative is contained in the non-aqueous electrolytic solution in such an amount that the discharge capacity retention after 50 discharge cycles is maintained at least 90% of the discharge capacity measured at a first discharge procedure.

3. The non-aqueous secondary battery of claim 1, wherein the disulfide derivative is contained in the non-aqueous electrolytic solution in an amount of 0.01 to 2 weight % based on the amount of the electrolytic solution.

4. The non-aqueous secondary battery of claim 1, wherein the disulfide derivative is contained in the non-aqueous electrolytic solution in an amount of 0.02 to 0.9 weight % based on the amount of the electrolytic solution.

5. The non-aqueous secondary battery of claim 1, wherein the disulfide derivative is contained in the non-aqueous electrolytic solution in an amount of 0.05 to 0.5 weight % based on the amount of the electrolytic solution.

6. The non-aqueous secondary battery of claim 1, wherein the disulfide derivative is diphenyl disulfide.

7. A non-aqueous electrolytic solution comprising an electrolyte dissolved in a non-aqueous solvent comprising a combination of a cyclic carbonate and a linear carbonate, wherein the ratio of cyclic carbonate to linear carbonate ranges from 1:4 to 7:3 and which contains a disulfide derivative having the following formula:

$$R^1\text{—}S\text{—}S\text{—}R^2$$

wherein each of $R^1$ and $R^2$ independently represents a phenyl group, a benzyl group, a tolyl group, a pyridyl group, a pyrimidyl group, an alkyl group having 1 to 12 carbon atom, or a cycloalkyl group having 3 to 6 carbon atoms, provided that each group may have one or more substituent groups in an amount of 0.02 to 0.9 weight %.

8. The non-aqueous electrolytic solution of claim 7, wherein the disulfide derivative is contained in an amount of 0.05 to 0.5 weight %.

9. The non-aqueous electrolytic solution of claim 7, wherein the disulfide derivative is diphenyl disulfide.

* * * * *